United States Patent [19]

Patterson

[11] Patent Number: 5,484,189
[45] Date of Patent: Jan. 16, 1996

[54] RETRACTABLE POP-UP HEAD REST USABLE WITH A VEHICLE PASSENGER SEAT

[76] Inventor: James Patterson, 214-2885 Boys Road, Duncan, British Columbia, Canada, V9L 4T6

[21] Appl. No.: 264,875

[22] Filed: Jun. 24, 1994

[51] Int. Cl.⁶ .................................................. A47C 7/36
[52] U.S. Cl. ........................ 297/410; 297/404; 297/408; 297/216.12
[58] Field of Search ............................ 297/216.1, 216.12, 297/216.13, 410, 408, 404, 391, 353

[56] References Cited

U.S. PATENT DOCUMENTS

| | | | |
|---|---|---|---|
| 3,397,911 | 8/1968 | Brosius | 297/410 |
| 3,420,572 | 1/1969 | Bisland . | |
| 3,561,806 | 2/1971 | Tse . | |
| 3,586,366 | 6/1971 | Patrick . | |
| 4,411,470 | 10/1983 | Nishimura | 297/410 |
| 5,056,816 | 10/1991 | Lütze . | |
| 5,110,185 | 5/1992 | Schmutz et al. . | |

FOREIGN PATENT DOCUMENTS 2318381  10/1974  Germany .............................. 297/408

*Primary Examiner*—Jose V. Chen
*Assistant Examiner*—Anthony D. Barfield
*Attorney, Agent, or Firm*—Dickstein, Shapiro & Morin

[57] ABSTRACT

A retractable pop-up head rest assembly is provided which is usable with a vehicle passenger seat. A head rest is mounted for vertical movement from a normally retracted position adjacent the seat to an extended operative position. The vertical movement of the head rest is provided by an elongated shaft which slidable relative to the seat and carries the head rest and is movable therewith. The shaft is mounted for rocking movement by a gap formed in the seat. The spring is mounted below the head rest for resiliently urging the head rest to move vertically from the retracted position towards the extended operative position. A trigger member is mounted below the head rest for restraining the vertical upward movement of the shaft from the retracted position. The shaft is rockably movable between a first position and a second position. The trigger member also restrains the rocking movement of the shaft from the first position to the second position and is operable in response to a predetermined amount force being exerted thereon caused by the rapid deceleration of the vehicle so as to permit the shaft to rock from the first position to the second position thereby causing the spring to urge the shaft from the retracted position towards the operative position.

21 Claims, 5 Drawing Sheets

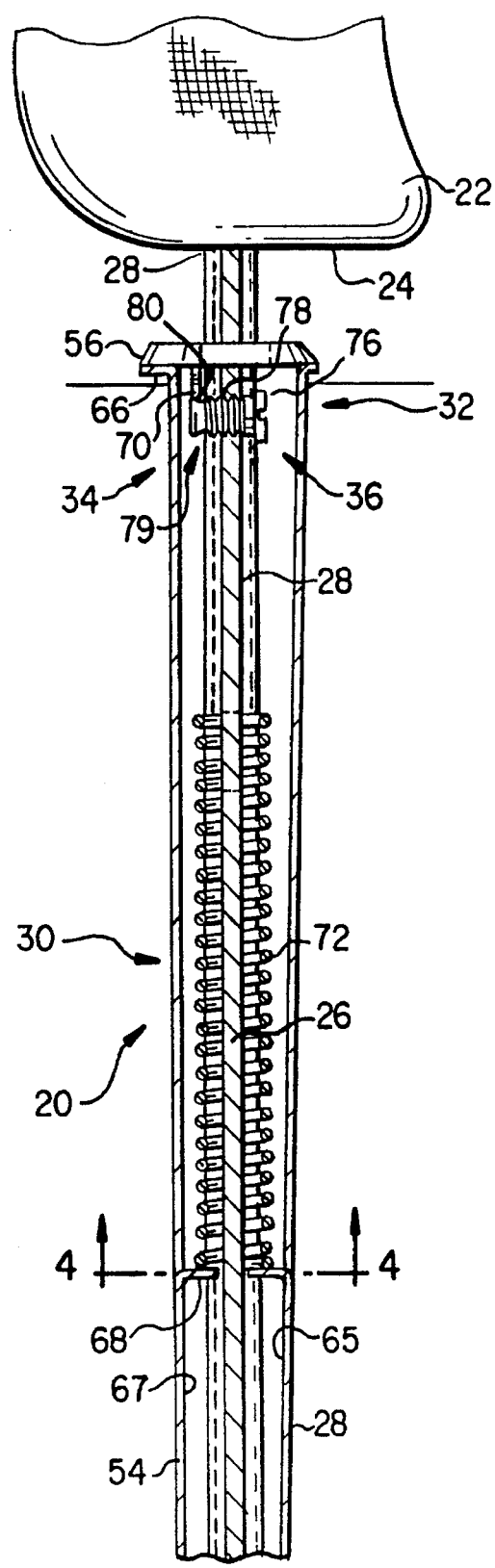
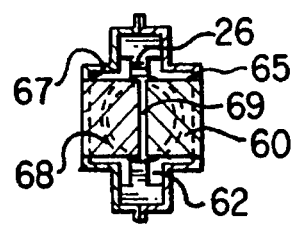
FIG. 3
FIG. 4

5,484,189

RETRACTABLE POP-UP HEAD REST USABLE WITH A VEHICLE PASSENGER SEAT

BACKGROUND OF THE INVENTION

Field of the Invention

The present invention relates generally to automotive head rests and, more particularly, to a retractable pop-up head rest usable with a vehicle passenger seat to limit the amount of extension of a passenger's neck during a rear end collision.

"Whiplash" is a common injury which occurs to seated passengers when the vehicle is struck from the rear, suddenly braked or impacted at the front. An impact from the rear causes the neck of a relaxed person to be suddenly extended, then to retract resulting in injuries to the neck or back. To prevent or minimize the possibility of whiplash occurring, vehicles have been equipped with head rests or supports, which are fastened to the top of the passenger seat and extend upwardly to a position immediately behind the passengers head, to limit and cushion the movement of the passengers head and neck relative to his torso in the vehicle. Such head rests have the disadvantage of being in a position to block the view of the driver as he turns his head to look to the side or to the rear. A further disadvantage is that some drivers find head rest to be uncomfortable and therefore undesirable.

Various solutions have been proposed in the art. For example, in U.S. Pat. No. 3,420,572, an automatically extending head rest is disclosed in which the driver actuates the device by actuating a switch on the dash board or steering wheel. This actuation mechanism has the disadvantage of having to be driver operated, and in the case of the rear end impact, the driver would be totally unaware of the impact occuring and, therefore, would not be able to actuate the automatic head rest.

U.S. Pat. No. 3,561,806 discloses a vehicle safety system in which a retracted head rest is extended to a position behind the drivers neck and is actuated by a seat belt mechanism. This system has the disadvantage of requiring the seat belt to be worn by the passenger so as to activate the device and extend the head rest into the extended position. Also, this system would require the seat belt restraint to be modified so as to be usable with the disclosed invention.

U.S. Pat. No. 3,586,366 discloses an inertia-responsive retractable head restraint device for use in conjunction with a vehicle seat back to prevent rearward motion of an occupant's head upon rapid acceleration of the vehicle thereby preventing whiplash injury to the occupant. The head rest disclosed is pivotably mounted to a restraint pad support member that is vertically adjustably carried by the seat back of the vehicle. A disadvantage of the disclosed device is the overall complexity of the device and the attendant cost to manufacture. A further disadvantage is that the device requires a special head rest adapted for pivotal movement relative to the seat.

U.S. Pat. No. 5,205,585, discloses an occupants safety device in which a headrest moves in conjunction with the movement of a rowbar. This device is actuated by crash sensors which are actuated in the event of a severe impact.

OBJECTS AND SUMMARY OF THE INVENTION

It is, therefore, an object of the present invention to provide an inertia responsive pop-up headrest eliminating or obviating the above-mentioned problems.

Another object of the present invention is to provide an inertia-responsive retractable pop-up headrest for use in conjunction with the back of a vehicle seat which is normally in a retracted position allowing the seat occupant rearview vision, but which is moveable into an erect position for restraining rearward head movement upon rapid acceleration or deceleration of the vehicle.

Another object of the present invention is to provide an inertia-responsive pop-up retractable headrest comprising a headrest which is axially mounted to a shaft carried by the seat of the vehicle.

Another object of the present invention is to provide an inertia-responsive pop-up retractable headrest comprising a headrest which is vertically adjustably carried by the seat back of the vehicle.

Another object of the present invention is to provide a head restraint device including a headrest which includes provision for maintaining the headrest in a fully erect position after release from its retracted position.

Another object of the present invention is to provide a retractable pop-up headrest assembly which is reliable in an operation relatively inexpensive to manufacture.

Another object of the present invention is to utilize a standard headrest so as to reduce the overall cost of the assembly.

These objects are achieved by providing a retractable pop-up headrest assembly usable with a vehicle passenger seat to limit the amount of extension of a passenger's neck during a rear-end collision. A head rest is mounted for vertical movement from a normally retracted position adjacent to the seat and below the passenger's neck to an extended operative position adjacent to and immediately behind the passenger's head. An elongated shaft is slidably mounted to a portion of the seat and carries the headrest and is moveable therewith. The shaft is mounted for rocking movement towards the passenger's head. Biasing means are provided for axially moving the headrest from the retracted position to the extended operative position. Vertical restraining means are provided for restraining the vertical upward movement of the shaft from the retracted position to the extended position. The shaft is rockably moveable between the first position where the vertical restraining means restrains the shaft from upward vertical movement and the shaft is caused to move vertically upwardly by the biasing means.

Horizontal restraining means are provided for restraining the rocking movement of the shaft from the first position to the second position in response to a predetermined amount of force being exerted thereon caused by the rapid deceleration of the vehicle so as to permit the shaft to rock from the first position to the second position which causes the biasing means to urge the shaft from the retracted position towards the operative position.

These and other objects of the present invention will become apparent from the following detailed description and appended claims.

The invention may best be understood with reference to the accompanying drawings wherein an illustrative embodiment is shown.

BRIEF DESCRIPTION OF THE DRAWINGS

FIG. 3 is a cross-sectional view taken along line 1—1 of FIG. 1;

FIG. 4 is a cross sectional view taken along line 2—2 of FIG. 2;

DETAILED DESCRIPTION OF THE INVENTION

Figures 1, 2:
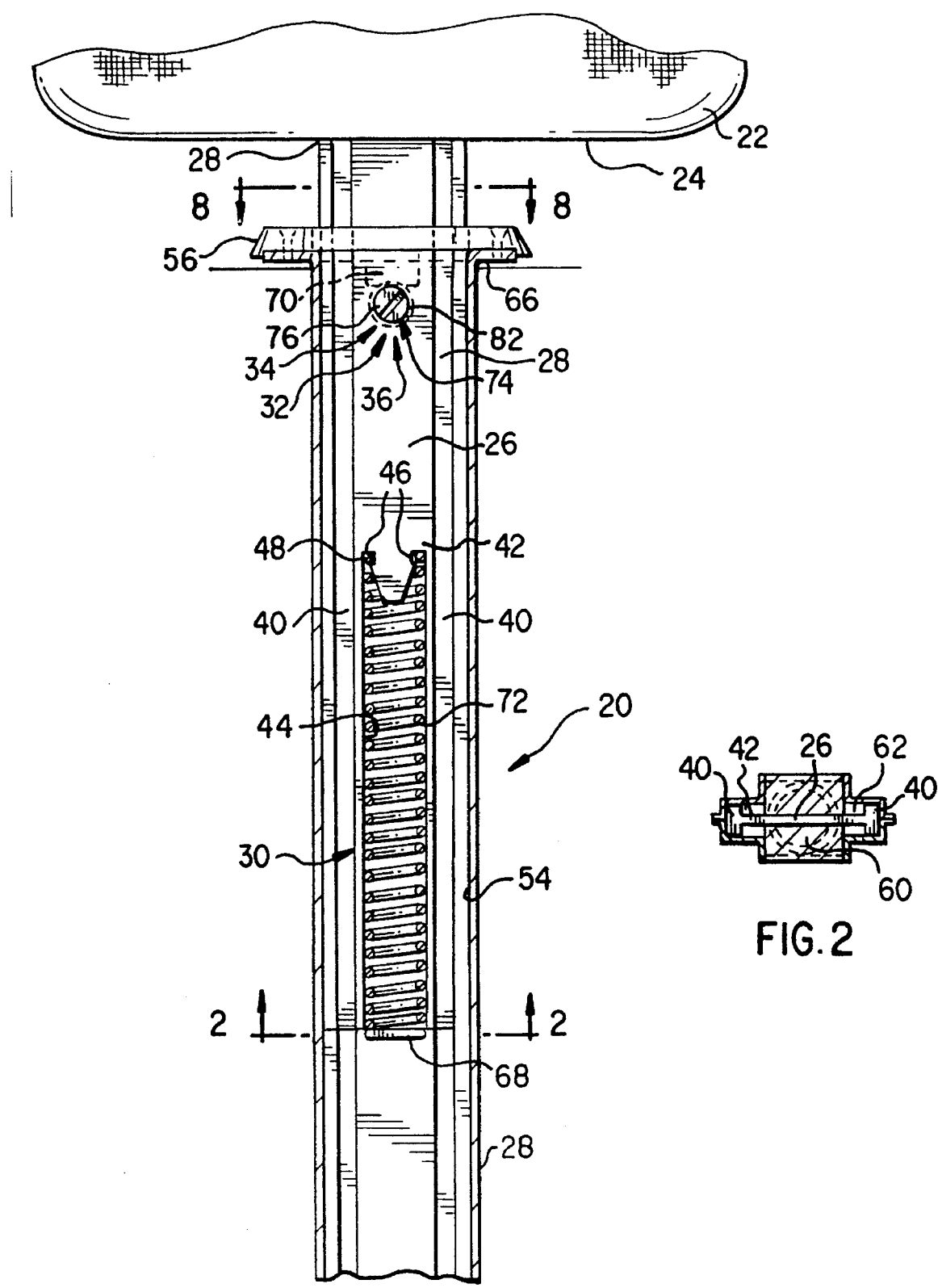
FIG. 1 is a front elevational view according to the present invention, shown partially in section, with the headrest assembly shown in the retracted position and the adjustable trigger engaged with the downwardly extending portion.
FIG. 2 is a side elevational view of the device of FIG. 1, shown partially in section.

Referring now more particularly to drawings, and initially to FIG. 1, there is shown therein a pop-up head rest assembly. More particularly, a pop-up retractive headrest assembly, generally indicated at 20, is disclosed for installation within a vehicle such as an automobile. For convenience, the assembly will be described in relation to the orientation illustrated, and consequently terms such as "above", "below", "forward", "rearward", etc. used herein are to be construed in their relative sense.

As shown, pop-up headrest assembly 20 includes a headrest 22 which is of generally elongated shape and extends across a substantial portion of the width of the vehicle seat, and is suitably cushioned with foam rubber or the like. Headrest 22 has a bottom surface 24 formed to be flush with an upper surface of the vehicle seat. As explained in more detail below, headrest 22 is preferably mounted to rock forward toward the passenger's head as it moves upwardly to an operative extended head supporting position from a retracted inoperative position.

As shown in the drawings for purposes of illustration, the invention is disclosed as applied to a vehicle seat (not shown) and it is to be understood that the present invention is applicable to all forms of moving vehicles and more particularly to those which are likely to be struck from the rear. Headrest 22, as explained in more detail below, will automatically rise from an inoperative retracted position to an extended position immediately behind the head of a passenger. Also as explained in more detail below, means are provided to cause the headrest to automatically extend from its retracted position to its extended position in response to an impact from the rear.

Headrest assembly 20 further includes a biasing means, generally indicated at 30, for resiliently urging head rest 22 and inner shaft 26 to move vertically upward from their retracted positions towards their extended operative positions. Vertical restraining means, generally indicated at 32, are mounted at an upper portion of inner shaft 26 for restraining the vertical upward movement of inner shaft 26 from its retracted position. Horizontal restraining means, generally indicated at 34 are also mounted at an upper portion 28 of inner shaft 26, for restraining the rocking movement of inner shaft 26 from the first position to the second position. Horizontal restraining means 34 are operable in response to a predetermined amount of inertial force exerted by head rest 22 caused by the rapid deceleration of the moving vehicle. This inertial force causes the shaft to rock from the first position to the second position thereby causing biasing means 30 to urge inner shaft 26 from the retracted position towards the operative position. Adjusting means, generally indicated at 36, are in cooperative engagement with the horizontal and vertical restraining means, 32 and 34, so that the amount of predetermined force can be adjusted.

Figure 6:
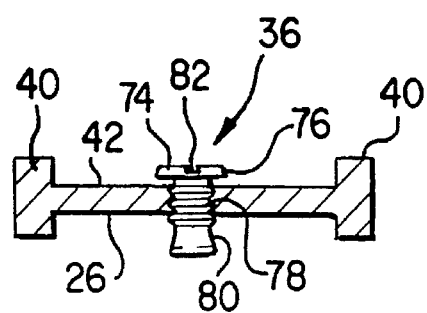
FIG. 6 is a top cross sectional view taken along line 6—6 of FIG. 5.

Inner shaft 26, as shown in FIGS. 1, 2, 4, and 6 is an elongated member movable between a retracted position in which headrest 22 is in a retracted inoperative position and a released position where headrest 22 is in extended operative position. Inner shaft 26, as shown in FIG. 6, is of an elongated H-configuration in cross-section having a pair of opposed leg portions 40, and a span portion 42, connecting leg portions 40. Leg portions 40 are essentially parallel to each other and the height of the leg portions 40 is roughly three times that of span portion 42 as shown in FIG. 6. The width of span portion 42 should be significantly greater than the height of leg portion 40 so that rotation of inner shaft 26 is prevented. Inner shaft 26 also has a longitudinal slot 44 formed therein as shown in FIG. 1. At an uppermost portion are a pair of opposed arcuate grooves 46 formed therein for retaining the upper most coil 48 of biasing means 30. Longitudinal slot 44 is formed in a central portion of inner shaft 26 and extends from a central portion thereof to lower edge 50 of inner shaft 26. Longitudinal slot 44 is formed within span portion 42. Also formed in inner shaft 26 is a threaded hole 52 at an upper end thereof. Threaded hole 52 is formed in span section 42 and extends transverse thereto.

Figure 8:
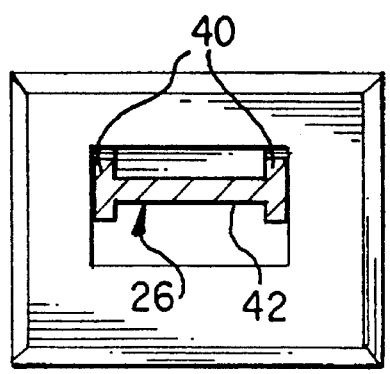
FIG. 8 is a top plan view, shown partially in section, taken along line 8—8 of FIG. 5, showing the gap between the shaft and the holding plate.
Figure 9:
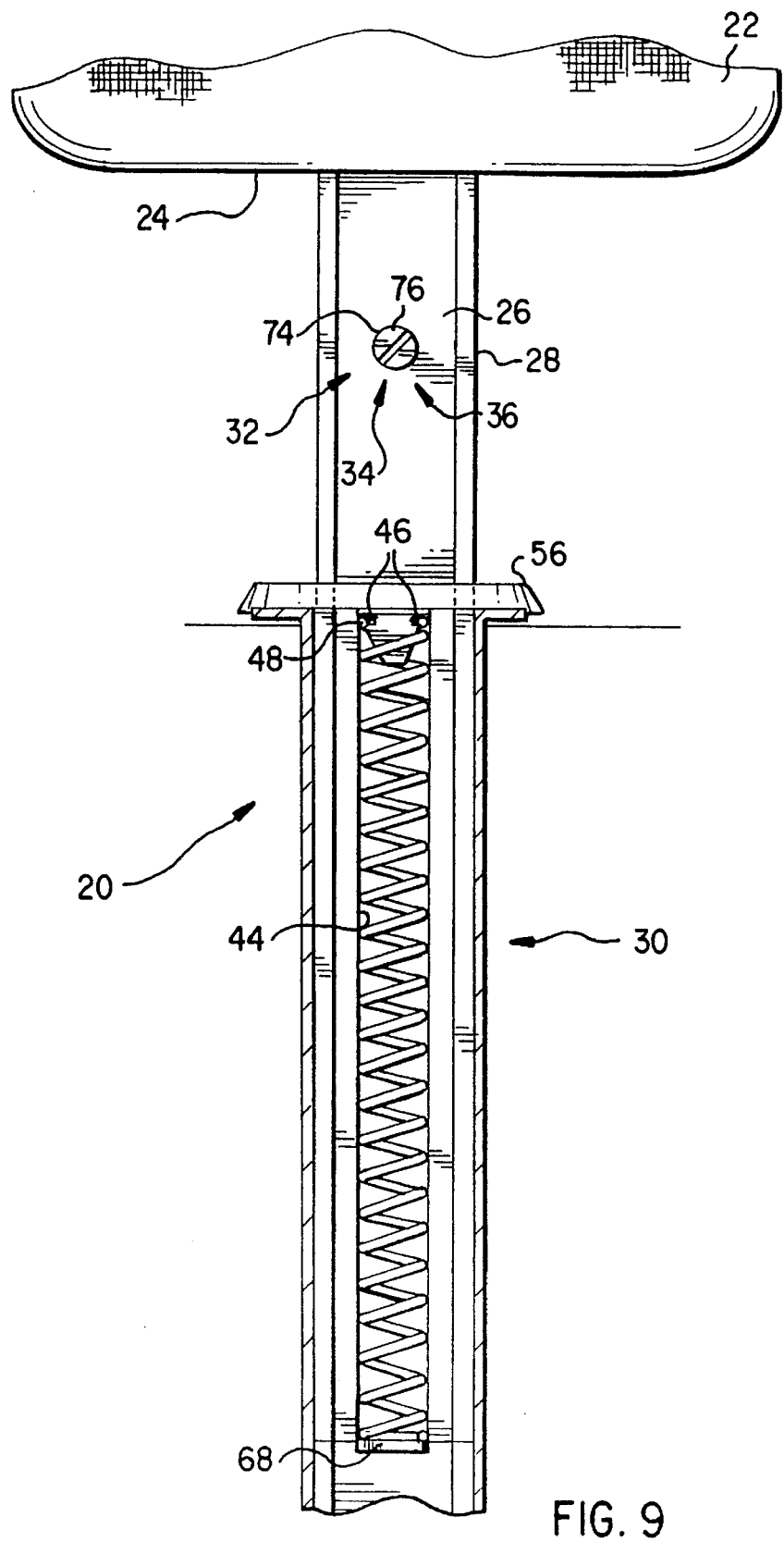
FIG. 9 is a front elevational view, similar to FIG. 1, with the head rest assembly shown in the extended position and the adjustable trigger released.

Inner shaft 26 is in telescoping relation with outer shell 54 as best shown in FIGS. 1, 2 and 9. Outer shell 54 is an elongated member co-extensive with a major portion of inner shaft 26. Outer shell 54 is attached at an upper end thereof to a holding plate 56. Holding plate 56 is in turn fastened to an upper surface of the vehicle seat. Outer shell 54, as shown in FIG. 2 in cross section, has a first pair of opposed longitudinal recesses 60, and a second pair of opposed recesses 62 having leg portions 40 mounted therein. A forward wall 65 is slightly tapered as shown in FIG. 2 with the horizontal spacing between forward wall 65 and a rear wall 67 of outer shell 54 becoming gradually larger from the bottom to the top of outer shell 54. Outer shell 54 is preferably formed or stamped from 2 pieces and can be tack welded together. A common section 64 is formed by an inner edge of each of the four recessed sections, 60 and 62 respectively. Outer shell 54 has a flanged portion 66 at an upper end thereof attached to and extending outwardly from the outer surface of outer shell 54. Flanged portion 66 has a rectangular shape as viewed in top plan view in FIG. 8. A plurality of threaded holes are formed in flange portion 66 so that flange portion 66 can be threadedly joined with holding plate 56. A spring stop 68, as shown in FIG. 1, is attached by any suitable method, such as crimping to a lower portion of outer shell 54. Spring stop 68 is attached at an inner peripheral surface of outer shell 54 in the first pair of recesses 60, as best shown in FIG. 2, and extends inwardly therefrom so as to form a lower surface to engage biasing means 30. Spring stop 68 includes a slot formed therein to allow span portion 42 of inner shaft 26 to slid therein.

Holding plate 56 is suitably attached to flange portion 54 and an upper surface of the vehicle seat by any suitable method such as screws. Holding plate 56 has an outer peripheral surface extending outwardly over flange portion 66 so as to cover it. Holding plate 56 has a downwardly extending portion 70 which extends downwardly from a lower surface 69 thereof and is spaced closer to rear wall 67 than to front wall 65 as shown in FIG. 3.

Biasing means 30 is provided in the form of a coil spring 72 which has its upper coil 48 engaged with arcuate grooves 46 as best shown in FIG. 1 and has its lower most coil in abutting relation with an upper surface of spring stop 68.

Vertical restraining means 32 includes an adjustable trigger 74, downwardly extending portion 70, and coil spring 72. Adjustable trigger at 74 has a head portion 76, a central threaded portion 78 integral with head portion 76, and an angled portion 80 integral at one end with threaded portion 78. Threaded portion 78 is threadedly engaged with threaded hole 52 in inner shaft 26 and angled portion 80 extends outwardly and rearwardly therefrom. Head portion 76 has driving means such as a screwdriver slot 82 although it will be understood that any suitable means for rotating adjustable trigger 74 can be used. Angled portion 80 has a smaller diameter adjacent threaded portion 78 and its outer peripheral surface or diameter gradually becomes larger at a distal end thereof.

Holding plate 56 has a rectangular opening therethrough, as shown in FIG. 8. The height of leg portions 40 is less than the height of first pair of opposed recesses 60 thereby forming a gap between surface 84 and surface 86 as shown in FIG. 4.

Figure 5:
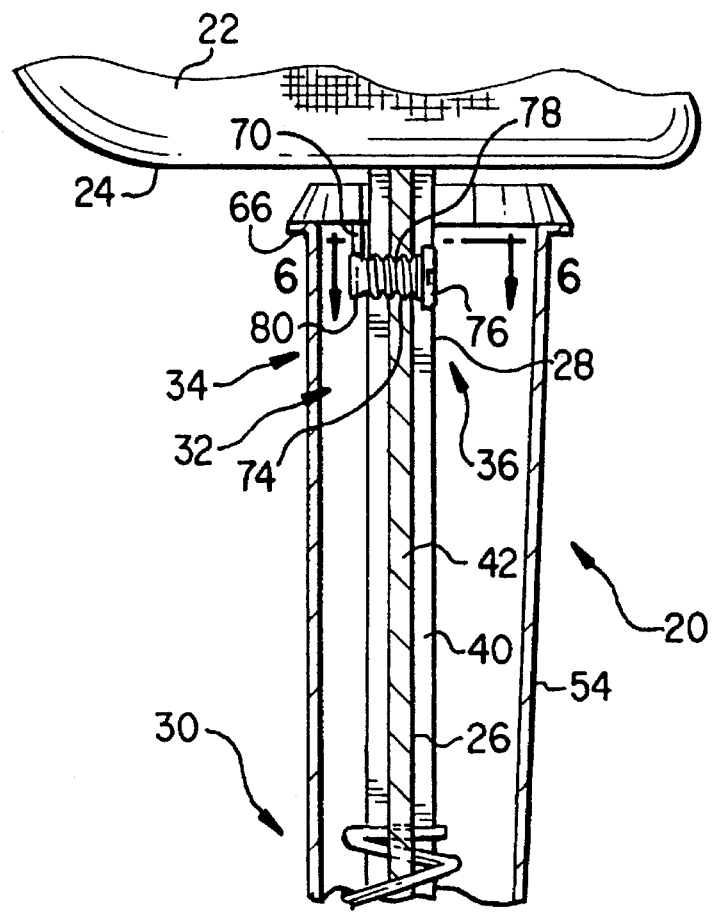
FIG. 5 is a front elevational view, shown partially in section, with the headrest assembly shown in the extended position and the adjustable trigger shown in the released position.

In the retracted position shown in FIGS. 1, 3 and 5 downwardly extending portion 70 and angled portion 80 are in cooperative abutting frictional relation. Downwardly extending portion 70 blocks the vertical upward movement of adjustable trigger 74 so as to prevent inner shaft 26 from moving from the retracted position towards the extended release position. It will be appreciated the coil spring 72 biases angled portion 80 into downwardly extending portion 70 so as to restrict the vertical movement of inner shaft 26 upwardly and it should also be appreciated that this frictional cooperative engagement restricts the forward or rocking movement of inner shaft 26. The force required to overcome adjustable trigger 74 can be adjusted by the selection of the spring constant for spring 72. The force required to overcome adjustable trigger 74 can also be adjusted manually by rotating adjustable trigger 74. As the distal end of angled portion 80 is moved outwardly from inner shaft 26, the force required becomes gradually greater. Conversely, as the distal end of angled portion 80 is moved inwardly towards inner shaft 26, the force required becomes gradually smaller. Similarly, the force can be adjusted by selection of spring 72 and the frictional coefficient of the materials selected for adjustable trigger 74 and downwardly extending position 70. The weight of head rest 22 can be varied to change the force required. It should be noted that head rest 22 must be of sufficient weight to overcome the force exerted by spring 72.

Figure 7:
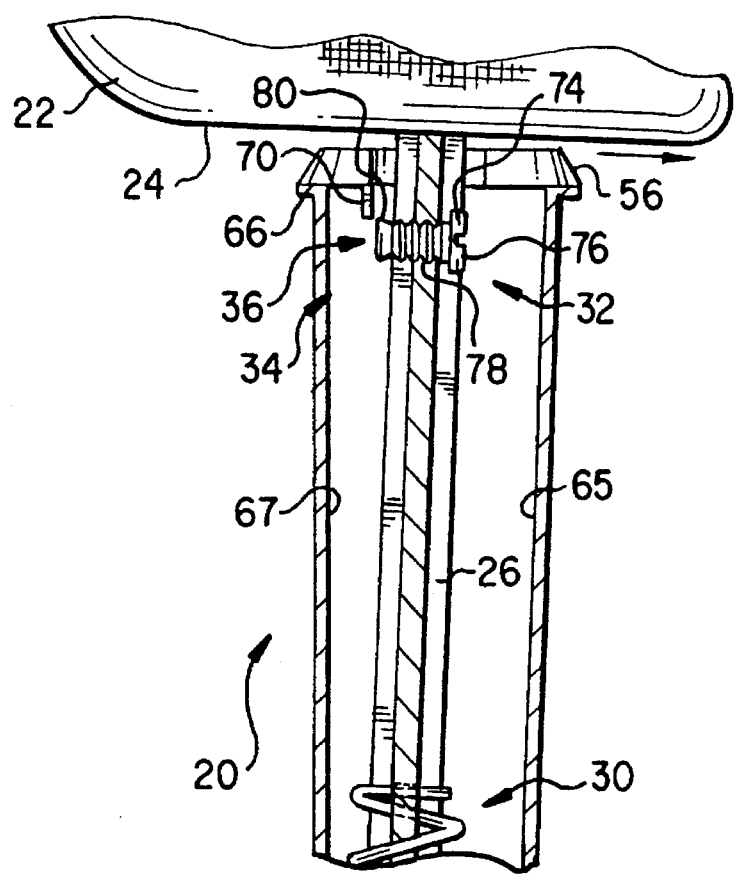
FIG. 7 is a side elevational view with the adjustable trigger almost released from the downwardly extending portion and the shaft shown rocking towards the second position.

In operation, pop-up head rest assembly 20 is normally in the retracted inoperative position. Forces caused by the rapid deceleration of the vehicle cause the inertia forces exerted by head rest 22 to overcome the frictional force exerted between downwardly extending portion 70 and angled portion 80 thereby causing inner shaft 26 to rock forwardly from the first position to the second position. As shown in FIG. 7, the forward rocking motion of inner shaft 26 causes angled portion 80 to clear downwardly extending portion 70. Once angled portion 80 is clear, coil spring 72 urges inner shaft 26 vertically upwardly towards the extended operative position. Alternatively, head rest 22 can be moved manually to or from the extended and retracted positions.

It will be appreciated that in response to an impact on the rear, headrest 22 will automatically rise from the retracted inoperative position to a head supporting position immediately behind the head of a passenger, thus limiting the amount of extension of a passenger's neck during a rear-end collision.

It should be noted that pop-up head rest assembly 20 is suitable for use on any vehicle which is likely to be struck from the rear. It should further be noted that pop-up head rest assembly 20 has been described in which a standard off the shelf conventional head rests can be utilized.

It should be apparent from the foregoing detailed description that a pop-up head rest assembly has been described which automatically moves to its operative head supporting position in response to an impact from the rear so as to prevent, or at least minimize the possibility of whiplash injuries to the passenger of a vehicle which has been struck from the rear.

While this invention has been described as having a preferred design, it is understood that it is capable of further modifications, uses, and/or adaptations thereof, following in general the principles of the invention, including such departures that have been within known or customary practice in the art to which the invention pertains.

I claim:

1. A retractable pop-up head rest assembly for use with a vehicle passenger seat comprising:

a head rest mounted for vertical movement from a normally retracted position adjacent the seat to an extended operative position;

the vertical movement provided by an elongated shaft 26 slidable relative to an elongated hollow outer shell and carrying said head rest and movable therewith, said shaft being mounted for rocking movement within a gap formed in the seat;

biasing means mounted below said head rest for resiliently urging said head rest to move vertically from said retracted position towards said extended operative position;

vertical restraining means mounted below said head rest for restraining the vertical upward movement of said shaft from said retracted position;

said shaft being rockably movable between a first position where said vertical restraining means restrains said shaft from upward vertical movement and a second position where said shaft is caused to move vertically upwardly by said biasing means;

horizontal restraining means mounted below said head rest for restraining the rocking movement of said shaft from said first position to said second position and operable in response to a predetermined amount of force being exerted thereon caused by the rapid deceleration of the vehicle so as to permit said shaft to rock from said first position to said second position thereby causing said biasing means to urge said shaft from said retracted position towards said operative position.

2. The head rest assembly according to claim 1, further comprising:

adjusting means mounted below said head rest for adjusting the amount of predetermined force required to be exerted on said horizontal restraining means so as to permit said shaft to rock from said first position towards said second position.

3. The head rest assembly according to claim 2, wherein said adjusting means includes an adjustable trigger member operatively connected to said shaft and extending outwardly therefrom and transverse thereto and engageable with said vertical retaining means and said horizontal restraining means, said trigger member being movable with said elongated shaft, and said biasing measure in a spring.

4. The head rest assembly according to claim 3, wherein said trigger member is threadedly engaged with said shaft and has a slot engageable with a driver for rotating said trigger member.

5. The head rest assembly according to claim 4, wherein said vertical restraining means includes a downwardly extending member and said trigger member, said trigger member being mounted for movement between an engaged position where said trigger member is in abutting engagement with said downwardly extending member when said shaft is in said retracted position and a released position where movement of said trigger member is uninhibited by said downwardly extending member.

6. The head rest assembly according to claim 5, wherein said horizontal restraining means includes said downwardly extending member and said trigger member, said trigger member being mounted for movement between an engaged position where said trigger member is in cooperative engagement with said downwardly extending member when said shaft is in said retracted position and a released position where movement of said trigger member is uninhibited by said downwardly extending member.

7. The head rest assembly according to claim 6, wherein said downwardly extending portion extends within said outer shell.

8. The head rest assembly according to claim 7, wherein said outside shell has a first pair of opposed longitudinal recesses and a second pair of opposed longitudinal recesses, each of said leg portions mounted for vertical sliding movement and for rocking movement in a respective one of said first pair of opposed recesses.

9. The head rest assembly according to claim 5, further comprising a holding plate fixedly securable to said outer shell, said holding plate having an opening formed therein through which said shaft extends.

10. The head rest assembly according to claim 9, further comprising, a portion of said shaft being slidably mounted in said outer shell for telescoping movement therein, said outer shell having a forward wall which is disposed at an angle relative to a rear wall thereof.

11. The head rest assembly according to claim 9, wherein opening in said holding plate is larger than the outer periphery of shaft so as to define a gap therebetween thereby allowing said rocking movement.

12. The head rest assembly according to claim 9, wherein said shaft is of an elongated H-configuration in cross-section and has a pair of opposed leg portions and a span portion connecting said leg portions.

13. The head rest assembly according to claim 9, wherein said opening in said holding plate conforms to the shape of said outer shell.

14. The head rest assembly according to claim 9, wherein said opening in said holding plate is of a rectangular shape and the diameter of said spring is larger than the horizontal distance between said second pair of recesses.

15. The head rest assembly according to claim 14, wherein the upward movement of said shaft into said extended position is halted when said spring upper portion is brought into abutting relation with said holding plate.

16. The head rest assembly according to claim 5, wherein said downwardly extending member blocks the vertical upward movement of said adjustable trigger so as to prevent said shaft from moving from said retracted position towards said released position.

17. The head rest assembly according to claim 16, wherein said outer shell includes a spring stop fixedly mounted to a lower end thereof and said shaft has a longitudinal slot having an upper surface formed therein, said spring having an upper portion and a lower portion, said upper portion being engaged with said upper surface of said longitudinal slot and said lower portion engaged with said spring stop.

18. The head rest assembly according to claim 3, wherein said adjustable trigger member has an angled portion engaged with said downwardly extending member.

19. The head rest assembly according to claim 18, wherein said angled portion extends into one of said second pair of opposed recesses and opposed portions of said spring extend into each of said second pair of opposed recesses.

20. The head rest assembly according to claim 1, wherein said biasing means is a spring.

21. A retractable pop-up head rest assembly for a vehicle passenger seat, comprising:

a head rest mounted for vertical movement from a normally retracted position adjacent the seat to an extended operative position;

the vertical movement provided by an elongated shaft slidable relative an elongated hollow outer shell and carrying said head rest and movable therewith, said shaft being mounted for rocking movement within a gap formed in the seat;

biasing means mounted below said head rest for resiliently urging said head rest to move vertically from said retracted position towards said extended operative position;

vertical restraining means mounted below said head rest for restraining the vertical upward movement of said shaft from said retracted position;

said shaft being rockably movable between a first position where said vertical restraining means restrains said shaft from upward vertical movement and a second position where said shaft is caused to move vertically upwardly by said biasing means;

horizontal restraining means mounted below said head rest for restraining the rocking movement of said shaft from said first position to said second position and operable in response to a predetermined amount of force being exerted thereon caused by the rapid deceleration of the vehicle so as to permit said shaft to rock from said first position to said second position thereby causing said biasing means to urge said shaft from said retracted position towards said operative position.

\* \* \* \* \*